(12) United States Patent
Bloomfield

(10) Patent No.: US 7,865,406 B2
(45) Date of Patent: *Jan. 4, 2011

(54) METHODS AND SYSTEMS FOR ELECTRONIC COMMERCE FACILITY CLIENT-BASED PRESENTATION OFFER MANAGEMENT

(75) Inventor: Mark C. Bloomfield, Ponte Vedra, FL (US)

(73) Assignee: IP Investments Holding, LLC, Ponte Vedra, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,184

(22) Filed: Feb. 11, 2010

(65) Prior Publication Data

US 2010/0145829 A1 Jun. 10, 2010

Related U.S. Application Data

(63) Continuation of application No. 12/415,415, filed on Mar. 31, 2009, now Pat. No. 7,664,682, which is a continuation of application No. 12/357,142, filed on Jan. 21, 2009, and a continuation-in-part of application No. 11/843,864, filed on Aug. 23, 2007, now abandoned.

(60) Provisional application No. 61/058,261, filed on Jun. 3, 2008, provisional application No. 61/119,543, filed on Dec. 3, 2008, provisional application No. 60/842,257, filed on Sep. 5, 2006, provisional application No. 60/866,716, filed on Nov. 21, 2006, provisional application No. 60/956,502, filed on Aug. 17, 2007.

(51) Int. Cl.
*G06Q 30/00* (2006.01)

(52) U.S. Cl. ........................................ 705/26

(58) Field of Classification Search ............... 705/26, 705/27
See application file for complete search history.

(56) References Cited

U.S. PATENT DOCUMENTS

6,285,989 B1 9/2001 Shoham
6,684,196 B1 1/2004 Mini et al.

(Continued)

OTHER PUBLICATIONS

A1 Auctions Online, http://web.archive.org/web/20000309042625/http://www.bullnet.co.uk/auctions/info.htm.

(Continued)

*Primary Examiner*—Amee A Shah
(74) *Attorney, Agent, or Firm*—Womble Carlyle Sandridge & Rice, PLLC

(57) ABSTRACT

A method, system and computer readable medium for facilitating interactive electronic commerce transactions over an electronic commerce network between a plurality of sellers and a plurality of buyers via an independent service provider. A request is received from a seller over the electronic commerce network to generate an auction program process associated with the seller. The auction program process associated with the seller is generated by an electronic commerce computer of the independent service provider. A Uniform Resource Locator (URL) hyperlink associated with the auction program process is generated by the electronic commerce computer. The URL hyperlink is communicated to the seller for insertion into a web page hosted on a website other than the independent service provider's website, wherein the web page displays information about an item for sale. The auction program process generated by the electronic commerce computer of the independent service provider is activated when a buyer clicks on the inserted hyperlink on the hosting website.

20 Claims, 9 Drawing Sheets

U.S. PATENT DOCUMENTS

| | | |
|---|---|---|
| 7,152,042 B1 | 12/2006 | Arkes |
| 2005/0027641 A1 | 2/2005 | Grove et al. |
| 2005/0182707 A1 | 8/2005 | Yeager |
| 2005/0273420 A1 | 12/2005 | Subramanian |
| 2006/0178978 A1 | 8/2006 | McLain et al. |
| 2006/0206517 A1 | 9/2006 | Hyder et al. |
| 2007/0100741 A1 | 5/2007 | Cui et al. |
| 2007/0106597 A1 | 5/2007 | Singh et al. |
| 2007/0143206 A1 | 6/2007 | Cui et al. |
| 2007/0255663 A1 | 11/2007 | Jordan et al. |
| 2007/0266093 A1 | 11/2007 | Forstall et al. |

OTHER PUBLICATIONS

Wurman et al., "The Michigan Internet AuctionBot: A Configurable Action Server for Human and Software Agents," Second Int'l Conf. on Autonomous Agents, May 1998.

Author unknown, "Yahoo! Auctions Experiences 400 Percent Growth in Past Year; Online Auction Service Celebrates Two-Year Anniversary as a Key Player in Competitive Category with New and Expanded Services," Business Wire, Oct. 16, 2000.

Online Auction Application Form

To generate an auction program for your item, please submit the following information:

Seller contact information:

First Name: John

Last Name: Doe

Email: Johndoe@realty.com

Phone: 904 555-1212

Information about the item to be auctioned:

Item asking price: $272,000.00

Item ID: (optional) MLS#255649

SUBMIT

FIGURE 5

METHODS AND SYSTEMS FOR ELECTRONIC COMMERCE FACILITY CLIENT-BASED PRESENTATION OFFER MANAGEMENT

CROSS-REFERENCE TO RELATED APPLICATIONS

This patent application is a continuation of U.S. patent application Ser. No. 12/415,415, filed on Mar. 31, 2009, which application is a continuation of U.S. patent application Ser. No. 12/357,142, filed on Jan. 21, 2009, which is a continuation-in-part of U.S. patent application Ser. No. 11/843,864, filed on Aug. 23, 2007, now abandoned. Patent application Ser. No. 12/357,142 claims the benefit of provisional patent application Ser. No. 61/058,261, filed on Jun. 3, 2008, and provisional patent application Ser. No. 61/119,543, filed on Dec. 3, 2008. Patent application Ser. No. 11/843,864 claims the benefit of provisional patent application Ser. No. 60/842,257, filed on Sep. 5, 2006, provisional patent application Ser. No. 60/866,716, filed on Nov. 21, 2006, and provisional patent application Ser. No. 60/956,502, filed on Aug. 17, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The embodiments of the invention relate generally to network-based electronic ecommerce and, in particular, to the buying, selling and negotiation between buyer and seller of goods and services on the Internet, and the methods and systems used to facilitate electronic commerce.

BACKGROUND INFORMATION

The Internet has been utilized for many years to provide the backbone necessary to facilitate and host communications and services by electronic commerce (herein referred to as ecommerce) companies who specialize in creating and managing virtual marketplaces for buyers and sellers to conduct business. Many third-party ecommerce companies, such as eBay, Inc., have become market makers in that they not only provide the platform and tools necessary to conduct an online business, but they also provide the market presence to attract many customers. With the proliferation and increasing volume of online businesses on the Internet, it has also become increasingly more difficult to establish a market presence without considerable costs.

Companies, such as eBay, Inc., have successfully reached the critical mass necessary to be pervasive in the ecommerce auction industry. It is estimated that there are over 1000 companies similar to eBay, Inc. that compete by offering a variety of auction-styled ecommerce environments that address a wide range of horizontal and vertical marketplaces. Historically, sellers want to conduct business where there are many buyers and buyers want to conduct business where there are many choices. As the online auction industry has matured, the mass market approach for many sellers has been an effort with diminishing returns as the principal differentiation for buyers has become price.

Prior art solutions for online auctions in the field of the invention are directed to one of the two methods for conducting online auctions. In the first example of prior art, a method is taught by companies that provide third party auction services such as eBay, Inc. These service providers provide use of their comprehensive auction platforms and ecommerce solutions for public use by sellers and buyers to conduct business. The basic elements that are common to this method are the seller creates a seller account with the third-party service provider and then lists the products or services to be sold on the provider's platform. Listing is accomplished by the seller via uploading and/or manually inputting descriptive information and photographs about the product into the provider's auction platform database. As a result of this uploading and listing step, an association is created between the seller and the product to be auctioned. Buyers are directed to the service provider's auction platform, to the product of interest, and thus to the seller, and therefore the elements necessary to conduct an auction are provided.

In the second example of prior art solutions, a method is taught by auction software solution providers that provide software that can be purchased and operated by the seller on its own internal server and platform environments to perform auctions such as that provided by the software provider A4auction (http://www.a4auction.com). Under this method, a seller could provide auction capability for products and services offered by the entire seller company or limit auction service to divisions or individual employees who sell on behalf of the company. This method involves the seller purchasing auction software technology, constructing an auction platform environment, and operating and maintaining an auction service for the benefit of the company and for the purpose of selling the company's products and/or services. The seller's products are listed on the auction platform by uploading or inputting photographs and descriptive information about the products to be auctioned into the seller's auction platform database. In some instances, a seller's auction platform may be integrated with the seller's business management system (s) for automated uploading of product information. Buyers are then directed to the seller's marketing website where they can shop for the company's products and make bids via an auction process.

Therefore, the prior art as it relates to the field of the invention includes solutions provided by third-party service companies such as eBay, Inc. that provide auction services on a third-party platform on the behalf of sellers, and auction software companies such as A4auction.com that provide software programs to sellers that can operate an internal auction platform under the control of the seller. The embodiments disclosed are differentiated from the prior art, at least in part, in that the embodiments provide the seller controlling benefits of a private internal auction system while providing the simplicity and cost effectiveness of a public service provider solution.

There exist a number of problems and challenges for sellers not addressed by third party service companies and their methods. Sellers, who market their products via the internet, make a considerable investment to differentiate themselves from their competition, through service, reputation, selection, presentation and price, including considerable investments in their own marketing websites for showcasing their products and services to prospective buyers. Conducting business on a third party service provider site such as eBay, Inc., site presents the seller's products and services to buyers but often it does so in an inferior presentation environment as compared to the seller's own marketing website. Additionally, directing or redirecting a seller's prospect to a third party site, such as provided by eBay, Inc exposes the seller's prospects and customers to competing products, services and companies. This latter is especially disconcerting if the seller's prospect or customer became interested in a product on the seller's website but because of linkage to the third party auction site, ended up conducting business with a competing company who is also providing similar products or services on the same auction site. Auction service companies have attempted to address this significant problem through the use of virtual storefronts where the buyer is redirected away from the seller's marketing site and to the hosted service provider's platform where presentation of and information about the seller's products are duplicated on the auction platform. Storefront solutions are for sellers who have a sufficient number of products and selling frequency to support the cost, operations, integration requirements of managing an online virtual auction store and are not conducive for one-off, infrequent, or ad hoc sales. Additionally, these auction sites often do not provide the same product presentation levels as the seller's own marketing sales site and promotes sellers as undifferentiated to buyers.

Auction software which can be purchased by the seller and installed on the seller's internal web servers provides the seller more control, customization, and customer retention because the internal auction environment does not redirect the buyer to a third party website that may contain competitive products and/or suppliers. The problems associated with a seller owned and operated auction solution are the high costs, complexity, integration requirements and manpower commitment required to operate and manage an internal auction platform and therefore is not a viable solution for one off, infrequent, or ad hoc auction sales.

In addition to the above problems, sellers have made considerable and ongoing investments in marketing websites that are best suited for demonstrating, informing, showcasing and branding their specific products and services to buyers and they desire to maximize those investments. To redirect a prospect away from the seller's website to a third-party website that features competing products and services is counter to that investment strategy.

As an example of the aforementioned, it is typical for a real estate company, who is in the business of selling real estate, to provide comprehensive descriptive information on their marketing listing websites about homes for sale including comprehensive background information, high quality photographs, virtual tours, neighborhood information, tax information, market information, blogs, and the like, all for the purpose of acquiring and servicing customers. For a real estate company to take advantage of a third-party auction service such as provided by eBay, Inc., they must abandon their own website presentation of a property listing and recreate the entire listing presentation on the eBay, Inc. auction website. This includes, but is not limited to, uploading or entering property descriptions, photographs, movies, documents, etc. as part of the listing process. This effort is duplicative and often does not present the property as well to a buyer as the seller's own marketing site, which could cause the buyer to be less interested in the property. Additionally, the buyer will be exposed to competitive offerings from competitive real estate companies substantially increasing the risk that the seller may lose the buyer to a competitor. This is counterproductive to the seller and reduces the effectiveness of their own marketing websites if in the end; the buyer must shop elsewhere to actually conduct business and ends up doing business elsewhere as a result. Alternatively, the real estate company could buy auction software programs, hardware servers, and operate and manage their own internal private auction platform to avoid these serious problems but this option is costly, complex, time consuming and would require the company in most cases to reconstruct their entire marketing website, even if there was only a single property to auction for a limited time period. This is not a viable solution for a real estate company who has infrequent auction requirements or a limited budget, technical skill, or manpower. There is room for improvement in the art.

SUMMARY OF THE INVENTION

Embodiments of the invention provide methods and systems for managing an electronic commerce environment that reduces the time, costs and complexity of prior art solutions, while providing optimum seller control, product presentation, and prospect retention. In the prior art solutions, all of the functions required to complete an online auction are provided in total by either an independent service provider or by the end-user software programs installed on a seller-controlled ecommerce computer environment. The specification (including claims) and drawings of U.S. patent application Ser. No. 12/357,142 are hereby incorporated herein in their entirety by reference.

In embodiments of the invention, the means and processes required to conduct an online auction are provided in the following manner. Using an online order form hosted by a third party service provider, the seller makes a request of the service provider to generate an auction program process by providing seller contact information and identification information about the product or service to be auctioned. The service provider generates the auction program process uniquely associated with the seller and the product and creates a publishable hyperlink that is communicated by the service provider to the seller for inclusion into the seller's marketing website which displays information about the product for sale. The auction program process associated with the hyperlink, hosted on the service provider servers, is activated over the ecommerce network when the auction hyperlink located on the seller's website is clicked by a buyer. When this hyperlink is clicked, a client auction user interface window is displayed and provides a means for the buyer to view competitive bids, if any, and to submit a new bid.

The appearance to the buyer is that the client auction interface is an integrated component of the seller's website even though it is being hosted by the service provider servers and independent from the seller. The buyer is not redirected from the seller's marketing site to the service provider's site and no competing product and/or services are presented to the buyer. The auction hyperlink located on the client side website (seller) contains information that was created in the auction program generation process such that when the hyperlink is clicked by a buyer, it executes the auction program process uniquely generated for that seller and product pairing residing on the service provider's servers.

A significant benefit to the seller utilizing the embodiments of the invention is that the buyer initiates the auction from the seller's existing marketing website and is not redirected to a third party site to participate in the auction with the seller. Descriptive information about the product or service being auctioned is not duplicated. The seller maintains control over the auction environment and enhances their own marketing website capabilities with the auction processes provided by the embodiments of the invention.

In embodiments of the invention, a method, system, and computer readable medium are provided for facilitating interactive electronic commerce transactions over an electronic commerce network between a plurality of sellers and a plurality of buyers via an independent service provider. In the method, a request is received from a seller over the electronic commerce network to generate an auction program process associated with the seller and an item for sale. The auction program process is unique to the seller and item pairing and is generated by an electronic commerce computer of the service provider. An auction hyperlink created during the auction program generating process, is uniquely associated with the auction program process and communicated to the seller from the service provider over an electronic commerce network for insertion into a web page hosted on a website other than the service provider's website, wherein the web page displays information about the item for sale. The auction program process generated by the electronic commerce computer of the service provider is activated when a buyer clicks on the inserted auction program process hyperlink on the hosting website. The system includes components operating on a processor for executing the steps of the method. The computer readable medium contains program instructions that enable the steps of the method when executed on a computer system.

BRIEF DESCRIPTION OF DRAWINGS

These and other advantages and aspects of embodiments of the invention will become apparent and more readily appreciated from the following detailed description of the embodiments taken in conjunction with the accompanying drawings, as follows.

FIG. 5 illustrates an exemplary web page user interface for receiving information from a seller about the seller and an item to be auctioned and request to generate the auction program process.

DETAILED DESCRIPTION OF THE EMBODIMENTS

The following description of the embodiments of the invention is provided as an enabling teaching of the invention including its best, currently known embodiment. Those skilled in the relevant art will recognize that many changes can be made to the embodiments described, while still obtaining the beneficial results of the disclosed embodiments. It will also be apparent that some of the desired benefits of the embodiments described can be obtained by selecting some of the features of the disclosed embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

The following patent applications, identified in the cross-reference to related applications, are incorporated by reference in their entireties herein: U.S. patent application Ser. No. 11/843,864, filed on Aug. 29, 2007; provisional patent application Ser. No. 60/842,257, filed on Sep. 5, 2006; provisional patent application Ser. No. 60/866,716, filed on Nov. 21, 2006; provisional patent application Ser. No. 60/956,502, filed on Aug. 17, 2007; provisional patent application Ser. No. 61/058,261, filed on Jun. 3, 2008; and provisional patent application Ser. No. 61/119,543, filed on Dec. 3, 2008.

The various embodiments of the invention described herein are directed to network-based electronic commerce facility bid management methods and systems.

Figure 1:
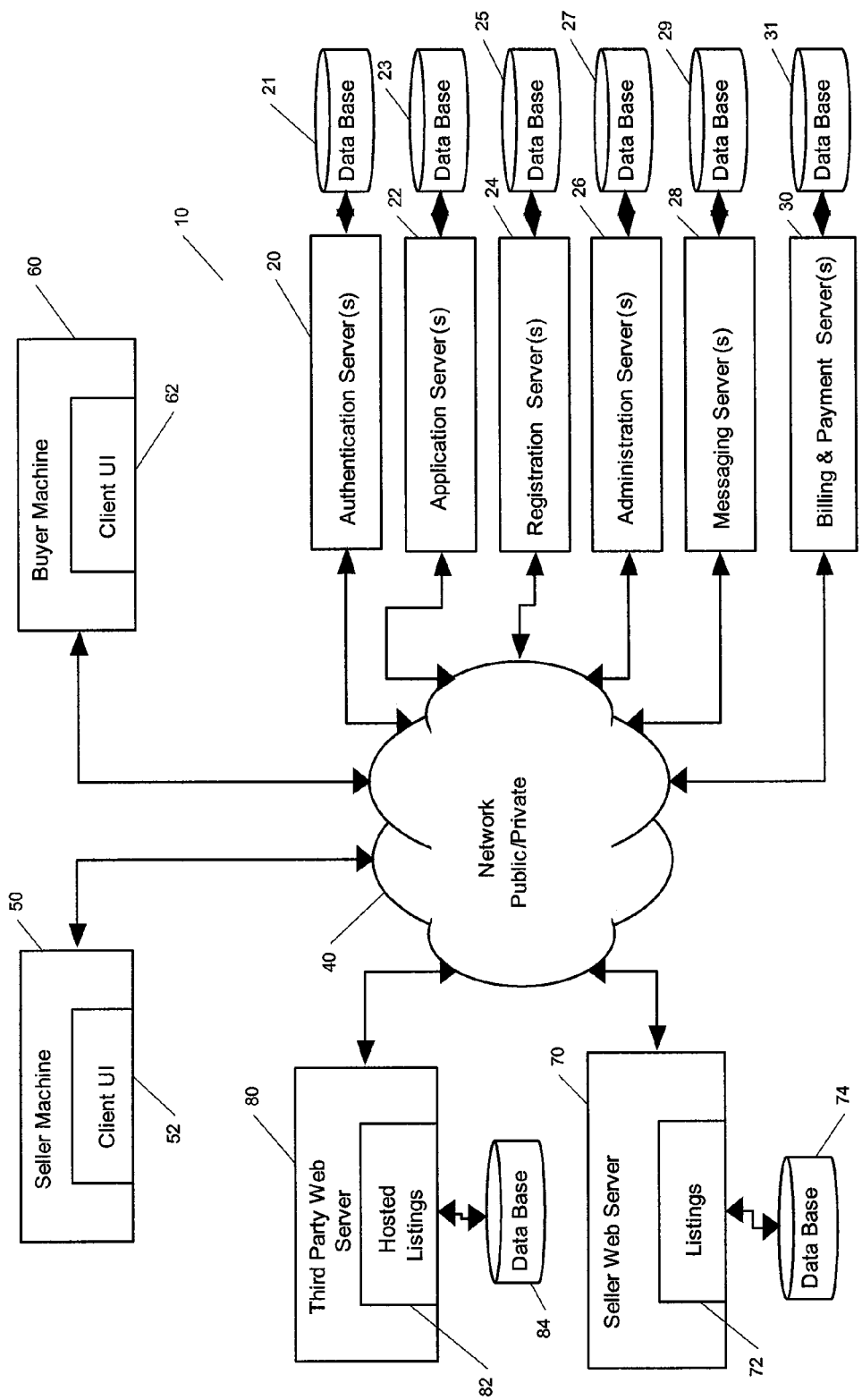
FIG. 1 is a network diagram depicting a system having a client-server architecture according to an exemplary embodiment of the invention.

FIG. 1 illustrates a network-based electronic commerce system 10 having client-server architecture according to an exemplary embodiment of the invention. The system 10 includes several specialized servers provided by an independent ecommerce service provider. The specialized servers of the independent service provider include an authorization server 20, an application server 22, a registration server 24, an administration server 26, a messaging server 28, and a billing and payment server 30. These servers share information and associated databases 21, 23, 25, 27, 29, 31 over a public or private network 40 to manage a transactional process between a seller 50 and a buyer(s) 60. Seller 50 and buyer 60 communicate with the servers over the network 40 via client user interfaces 52, 62, respectively. The servers of the independent service provider may be co-located or geographically dispersed over a wide area. Some of the specialized servers 20, 22, 24, 26, 28, 30, 32 may combine some or all of the functions of the other servers. In another aspect, the processes and databases of each of the specialized servers could be combined and operated from a single server and database.

Registered sellers can list items for sale 72 on the seller's web server 70. The list of items for sale by the seller can be stored in database 74. Items for sale can also be listed on a third party web server 80 hosting the listings 82 of items for sale by at least one seller. The hosted listings 82 can be stored in database 84. In this context, the third party web server 80 is directly associated with the seller, and is distinct from the independent service provider.

Within the ecommerce system, the registration server 24 is used to present to sellers 50 a means for registering an item for sale to enable the acceptance of bids from prospective buyers

Figure 3:
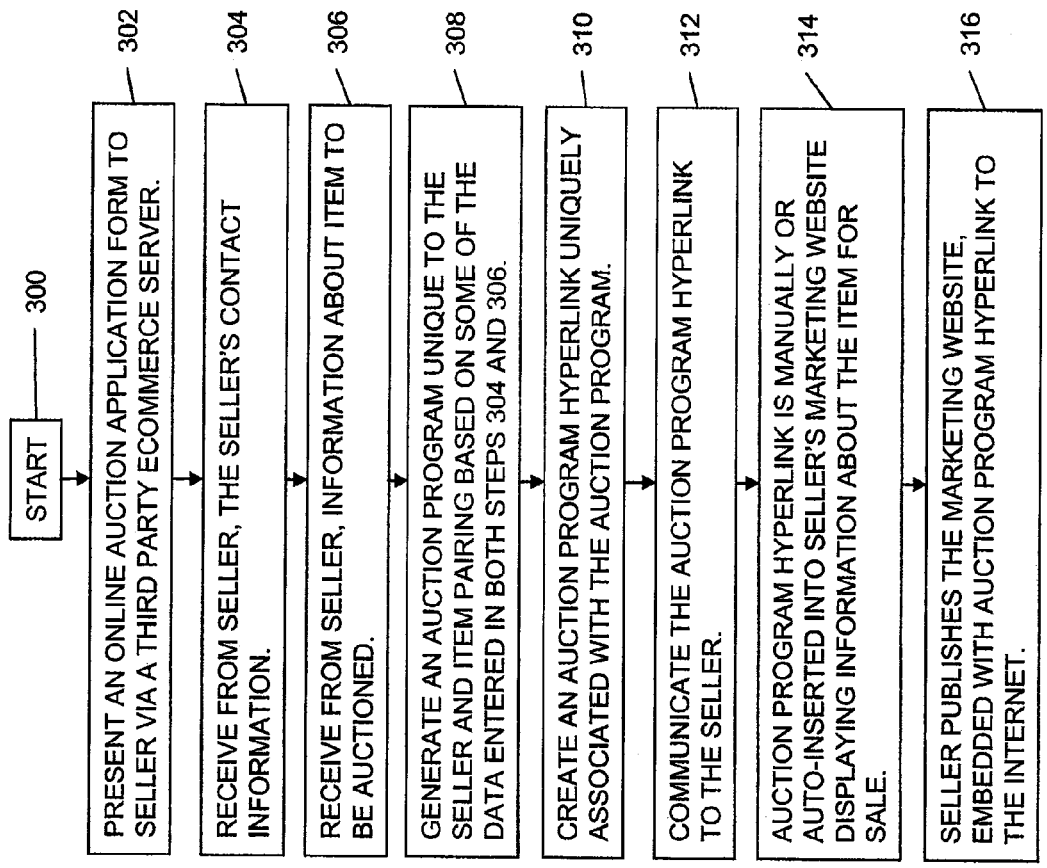
FIG. 3 illustrates the processing logic for accepting a request from a seller to generate an auction program process, generating the auction program process and associated hyperlink and insertion of the hyperlink into the seller's website for presentation to a buyer.

60. The computers associated with both buyers and sellers are clients or client devices in the client-server architecture employed by the invention. In the context of the invention, a seller can include, but is not limited to, an individual seller, a merchant, a vendor, an agent or a sales representative. An item for sale can include, but is not limited to, a product, a service, real property, personal property, intellectual property and any combination of the foregoing. Sellers 50 complete an application on the registration server 24 including seller information and identification information associated with the item being auctioned. An example of the seller registration process is depicted in FIG. 3 and FIG. 5. In this embodiment, an auction program process associated with a hyperlink is generated and associated with the seller and item. The auction program hyperlink is also referred to herein as a code segment. More generally, the auction program process hyperlink can be a web widget, i.e., a portable segment of code that can be installed and executed within an HTML-based web page by an end user. The code segment can be embedded within the web page and does not require additional compilation. The unique auction program process and the associated auction program process hyperlink are generated by the registration server 24 based on the information provided by the seller 50 during the application process and the auction program process hyperlink can be electronically communicated to the seller in a manner such that the seller can manually insert the HyperText Markup Language (HTML) into a marketing website hosted on a web server 70 owned by, or under the control of, the seller.

Figure 2:
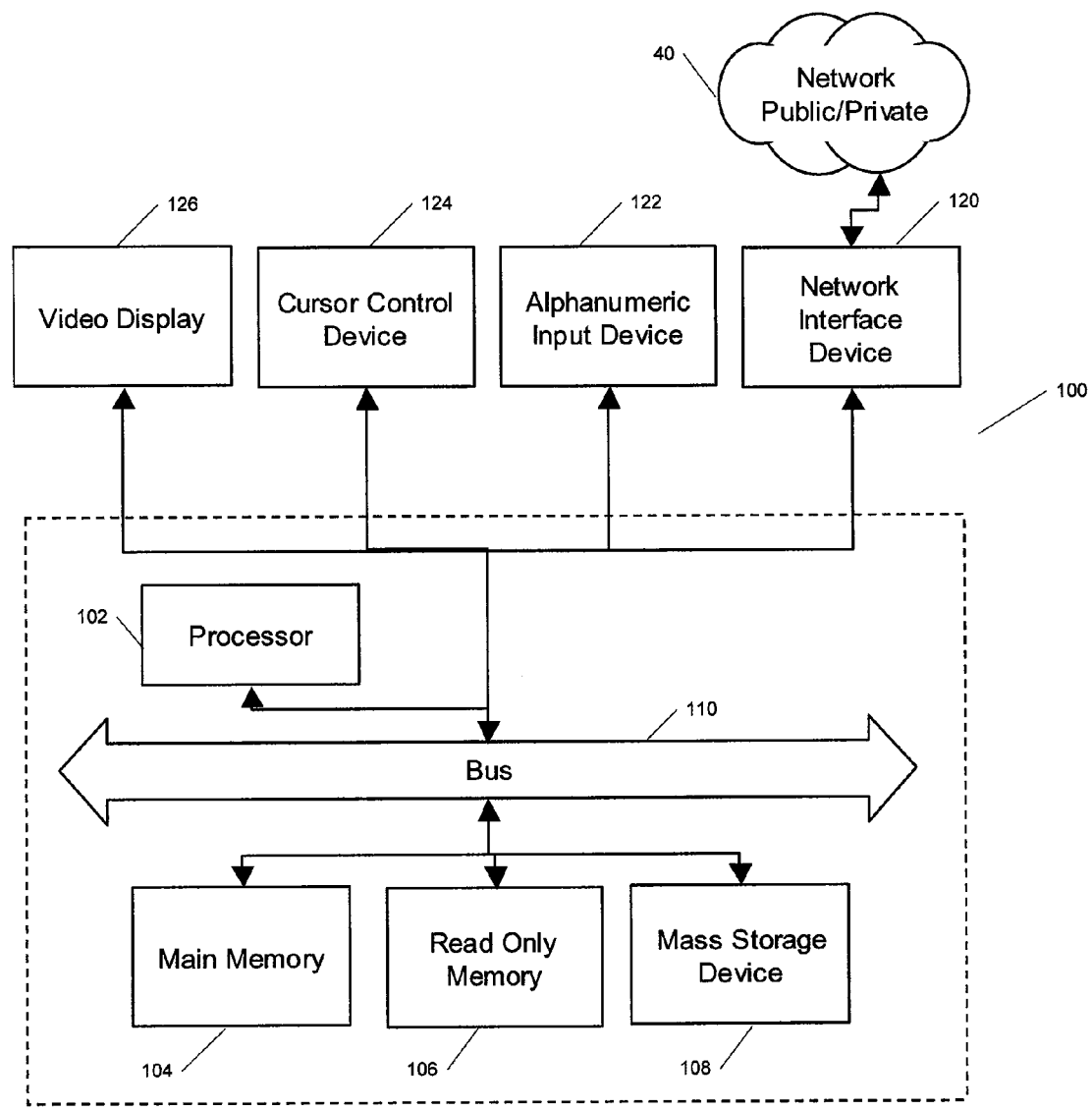
FIG. 2 is a block diagram illustrating a general programmable processing system in accordance with the various embodiments of the invention.

FIG. 2 illustrates a general programmable processing system 100 that can be used in the various embodiments of the invention, e.g., seller machine 50, buyer machine 60. Components of the general processing system 100 include processor 102, main random access memory (RAM) 104, read only memory (ROM) 106, and mass storage device 108. Communications between the processor 102 and RAM 104, ROM 106 and storage device 108 takes place over communications bus 110. Other components of the processing system 100 include video display 126, cursor control device 124, alphanumeric input device 122 and network interface device 120. The network interface device 120 enables communications with other processing devices over private or public network 40.

As illustrated in FIG. 3 in logic block 302, the method for facilitating interactive electronic commerce transactions between a plurality of sellers and a plurality of buyers via an independent service provider begins with an electronic commerce server receiving a request from a seller to generate an auction program process associated with the seller and an item for sale. As indicated in blocks 304 and 306, the seller is identified by the ecommerce server by submitting name and contact information and may, optionally, submit basic information about the item being auctioned such as an asking price and product identification. Descriptive information about the item, including photographs is not required as the item descriptive information is available to the buyer on seller's marketing website where the auction is conducted. The buyer, seller, and ecommerce service provider are three separate and discrete entities. The independent service provider generates a unique auction program process for each seller and can accommodate any number of sellers. Therefore, the seller does not have to possess any costly infrastructure to auction a product or service. The only seller requirement is having a website where a product or service for auction can be listed. The request from the seller is sent over the electronic commerce network. As used herein, the term seller can include an agent or a representative of the seller. As indicated in logic block 308, the electronic commerce computer of the independent service provider generates an auction program process that is associated with the seller and the item being auctioned. The auction program process can be generated without uploading to the electronic commerce computer any descriptive information about the item being auctioned. In some embodiments, the auction program process generated by the electronic commerce computer can include one or more conditions of sale that are specified by the seller.

Upon generating the auction program process, the electronic commerce computer generates an auction program process hyperlink associated with the auction program process as indicated in logic block 310. In exemplary embodiments, the hyperlink can include a code segment in the form of computer program instructions that are executed to display auction information on the web page and to communicate auction information over the electronic commerce network. The electronic commerce computer then communicates the hyperlink to the seller for insertion into a web page hosted on a website wherein the web page displays information about the item for auction. This step is indicated in logic block 312. The hyperlink can be communicated in various ways, including transmitting the hyperlink directly from the independent service provider electronic commerce computer to the seller. The hyperlink also can be communicated to the seller by having the seller log onto the electronic commerce server via the electronic commerce network to retrieve the hyperlink by copying the hyperlink and then pasting the hyperlink obtained in this manner on a web page hosted on another website, e.g., the seller's website. The hyperlink can further be communicated automatically by the electronic commerce server via the electronic commerce network without manual intervention from the seller for automatic insertion into the seller's marketing website.

Each of the steps described thus far are performed by the independent service provider thus eliminating the expense of installing an auction software program on the ecommerce site of each seller. Upon receiving the auction program process hyperlink from the electronic commerce computer, the seller, in the preferred embodiment, enters the auction program process hyperlink into a web page that displays information associated with the item for sale, as indicated in logic block 314. The seller then publishes the web page embedded with the auction program process hyperlink to enable buyers to make bids on the item for sale over the electronic commerce network. This step is indicated in logic block 316.

Figure 4:
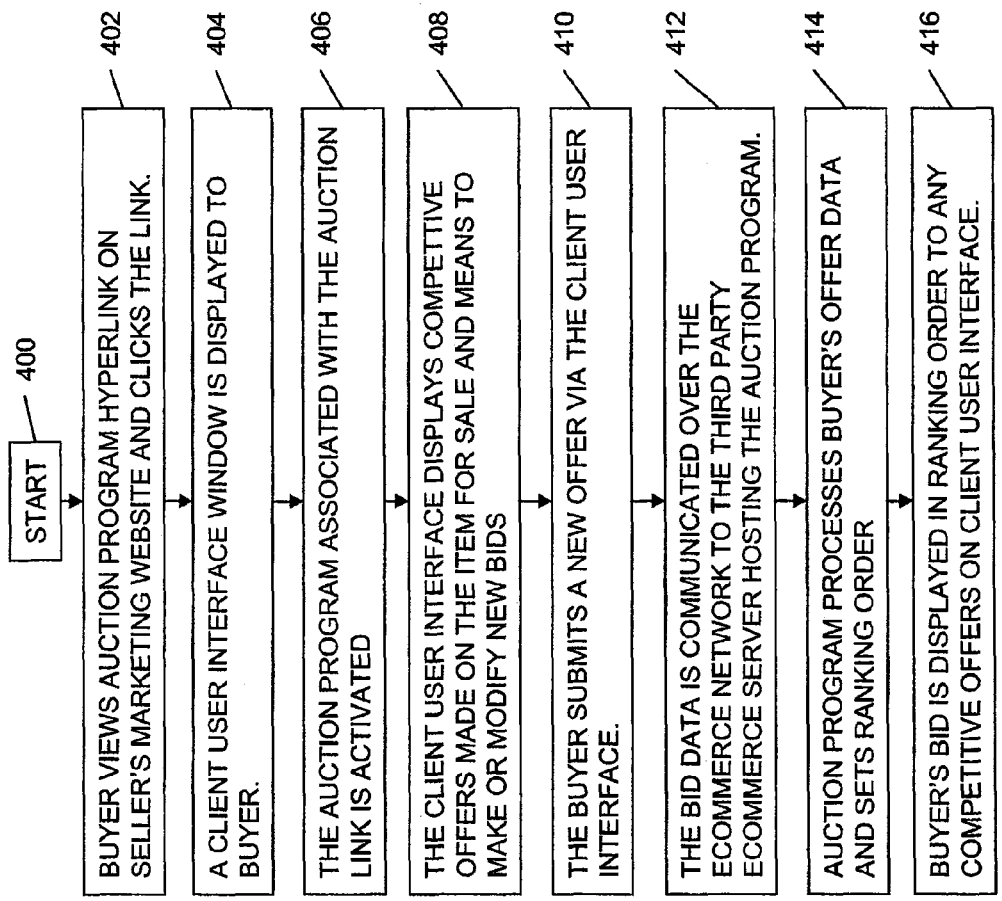
FIG. 4 illustrates the processing logic for a displaying the client auction user interface to a buyer, receiving a bid submission from a buyer and displaying the buyer bid in the client user interface in ranking order as compared to any other existing bids.

FIG. 4 illustrates exemplary processing logic for auction activation and buyer bid submission on the seller marketing website via the auction client user interface occurring after the seller publishes the web page containing the unique auction program process hyperlink. Processing begins in block 400. A prospective buyer initiates the online auction process by clicking on the auction program process hyperlink as indicated in logic block 402. A buyer clicking on the hyperlink will open a client user interface that is uniquely associated with the auction program process as indicated in logic block 404. Concurrently, the auction program process associated with the auction program process link and residing on the service provider ecommerce server is activated over the ecommerce network as indicated in logic block 406. The auction program process queries the database, loads the seller and item record and active bid data into a display template, generates HTML from the display template and sends the resulting HTML to the browser client interface providing the buyer a means to view existing bids, place a new bid, or modify an existing bid initiated from this window as provided in logic block 408. In process logic block 410, the buyer submits a bid via the interactive client user interface that communicates over the ecommerce network to the third-party ecommerce server hosting the associated auction program process as indicated in logic block 412. The ecommerce server updates the database records with the new bid information received from the buyer, sorts and ranks the bid data from all active bids as indicated in logic block 414. The process is completed in logic block 416 when the auction program process generates a new display template based on the active bids, sends the generated HTML to the browser window displaying the buyer's bid as compared to other active bids in ranking order.

FIG. 5 shows an exemplary online application form that originates a request from a seller to the service provider to generate an auction program process on behalf of the seller. Some of the information provided in this form will be used by the service provider to build the database records for the seller and item pairing and to generate the auction program process uniquely associated with the seller. Information about the item to be auctioned could include item identifiers and asking price.

Figure 6:
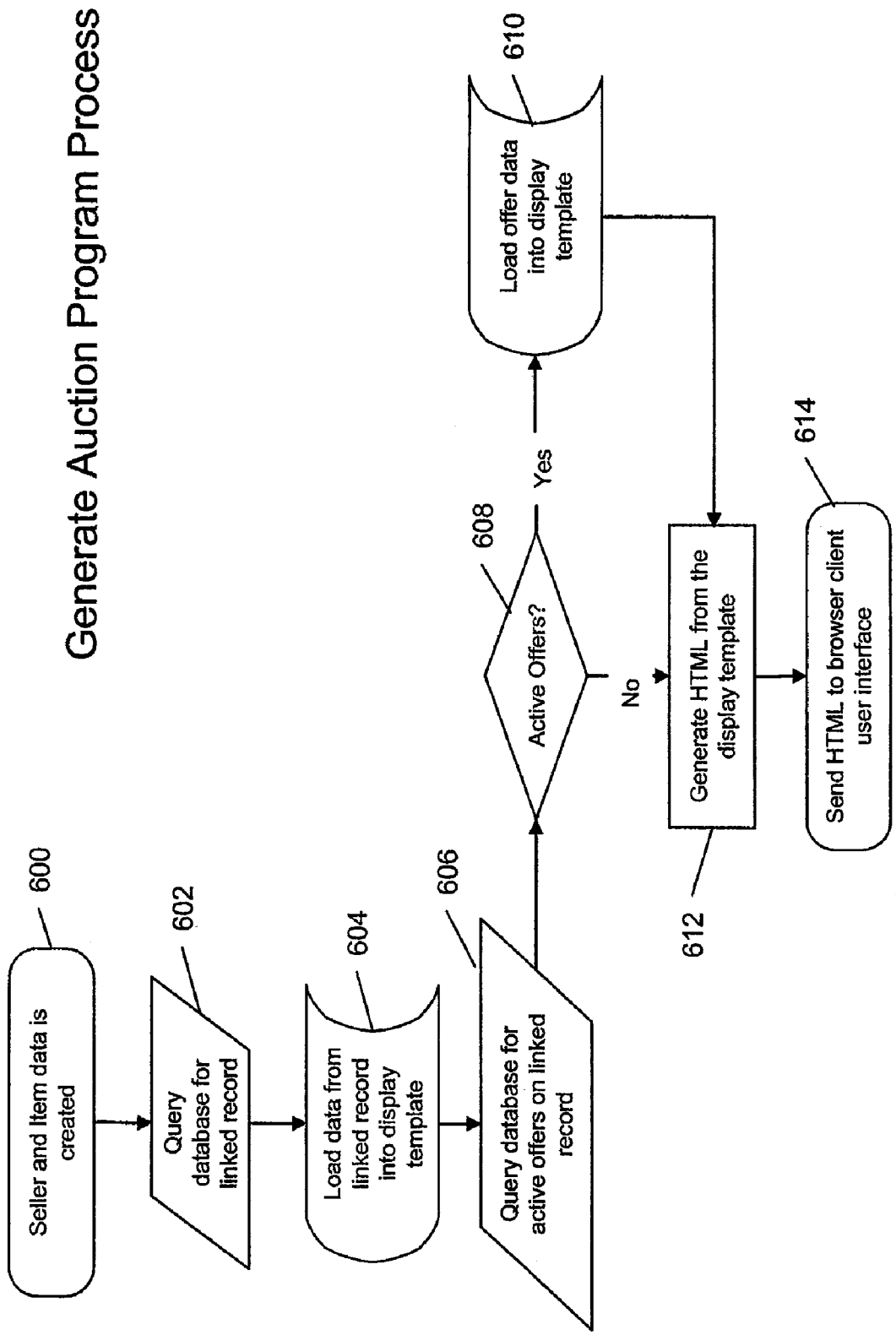
FIG. 6 illustrates the processing logic for generating an auction program process.

FIG. 6 illustrates the process logic for generating an auction program process uniquely associated with the seller and item pairing. Starting at logic block 600, seller and item data obtained from the seller through an online application form as shown in exemplary form in FIG. 5 is first entered by the ecommerce computer into the server database record and linked. In logic block 602, the auction program process queries the database for the linked record and loads the record in logic block 604 into a display template. In logic blocks 606 through 610, the auction process determines if there are any active bids of the linked record, and if so loads this data into the display template. At logic block 612, html code is generated from the display template, and as indicated in logic block 614, sent to the html browser client interface when activated by the buyer upon clicking the associated auction program process hyperlink.

Figure 7:
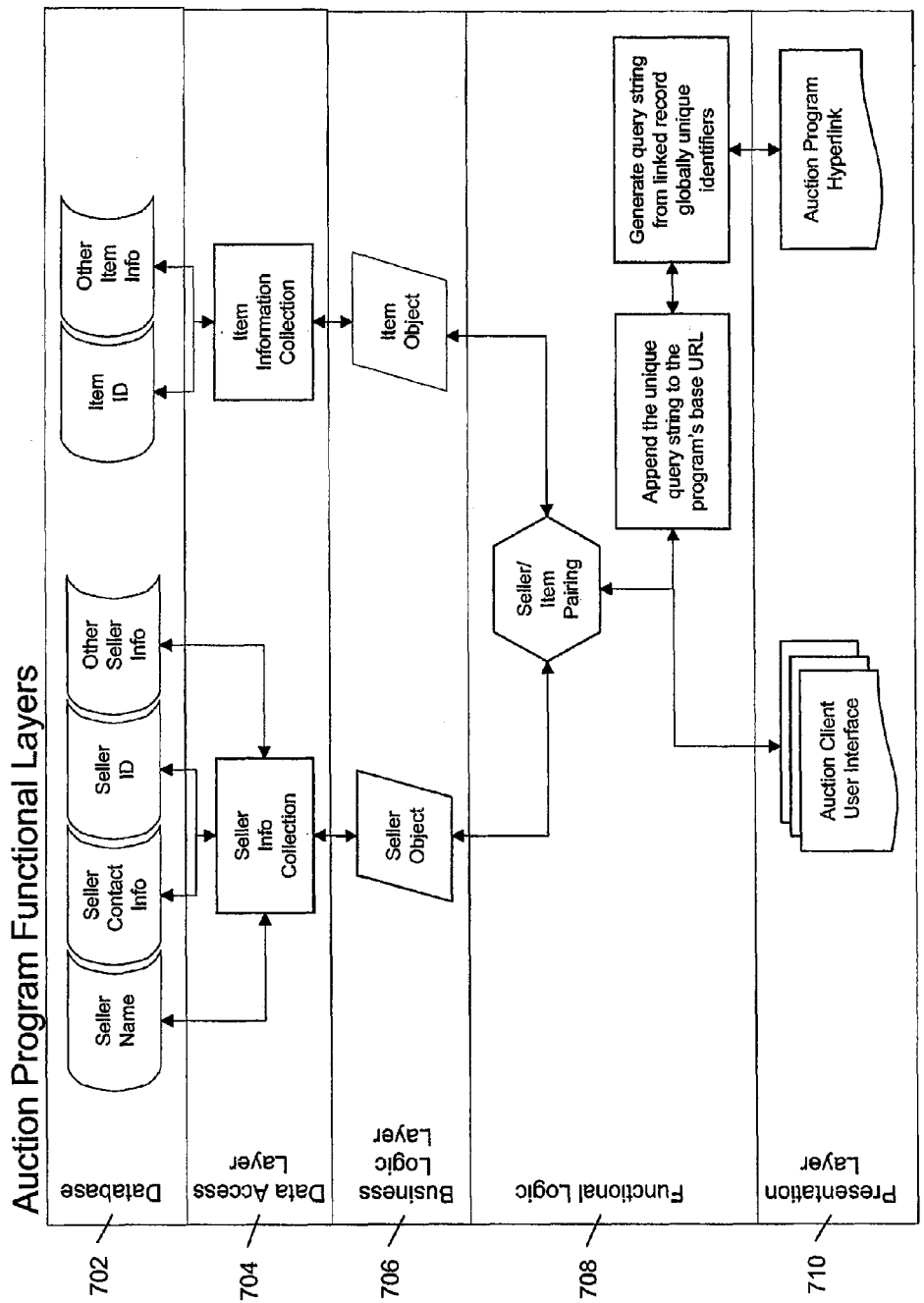
FIG. 7 illustrates the auction program functional layers and processes used in generating an auction program process unique to the seller and item pairing.

FIG. 7 illustrates the functional layers of the auction generation process. Starting at functional layer 702, the database records for the seller and item information are created and stored. The data access layer 704 provides the business logic access to the data records for collecting the seller and item information. In the business logic layer 706 the information is abstracted into functional objects and rules and constraints are defined. The functional logic layer 708 ties the presentation of the program together with the business logic and controls the flow through the auction program, including the process of generating the html for the auction program hyperlink and the client user interface. The presentation layer 710 provides the user interfaces for display of the information and interface to the buyer.

Figures 8, 9:
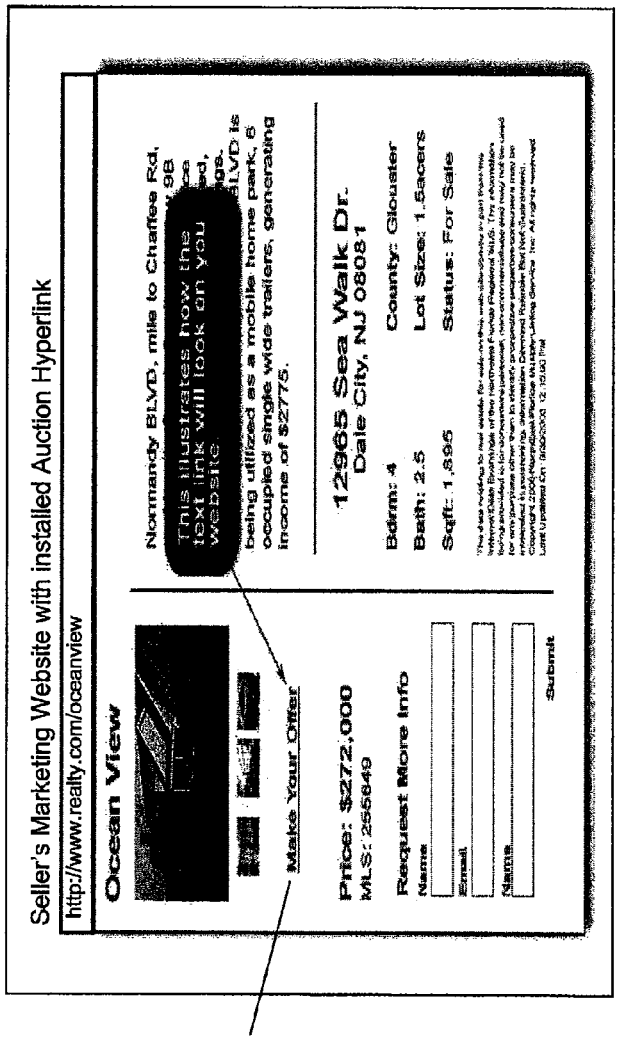
FIG. 8 is an exemplary user interface for creating a custom text hyperlink to be associated with an auction program process.
FIG. 9 illustrates an exemplary seller's website page displaying an item for auction and the auction program process hyperlink associated with the item being displayed.

FIG. 8 shows an exemplary client user interface providing the seller a means to generate a textual hyperlink using custom script 802 incorporating the auction program process hyperlink.

FIG. 9 shows an exemplary web page of a seller's marketing website containing the auction program process link, 902 and hyperlinked to the auction program process provided by the third party service provider to the seller for inclusion into the seller's marketing website displaying the item being auctioned.

Figure 10:
FIG. 10 illustrates an exemplary client auction interface that is displayed when a buyer clicks on the auction program process hyperlink, displaying competitive bids, if any on the item and a form for accepting a bid from a buyer.

FIG. 10 shows one such exemplary client user web page. In this example, the client user interface 1002 displays identification of the item, the asking price and information regarding the bids from other prospective buyers ranked in order based on the auction program process generated for that item. Buyers enter new bid information using the data entry fields 1004 and register their bid with the seller by clicking on the registration button 1006 and entering their contact information.

In an exemplary embodiment, the invention provides a method for presenting, as part of the registration process, a number of conditional options that are required to be answered by a prospective buyer 60 during the bid process and that may be selected by the seller 50 and made part of the bid web page presented to prospective buyers 60. The method includes a means for the seller 50 to set absolute conditions regarding a bid from a prospective buyer 60. FIG. 10 illustrates a user interface for enabling a prospective buyer to enter bid information including any contingency information. A further embodiment includes a means for the seller 50 to set non-absolute conditions based on weighted preferences regarding a bid from a prospective buyer 60. A further embodiment includes the means for a seller 50 to set the importance level of certain conditions which will be used to compare and rank bids from prospective buyers 60.

Another embodiment provides a method of managing the communications among the parties to a bid transaction. This embodiment also includes the real-time updating of communications among parties through electronic communications such as email and including in the communications the current ranking of each of the prospective buyers' bids, and embedded links to change, modify, or terminate a buyers' respective bid. This embodiment enables free flowing communications between prospective buyers 60 and seller 50 while at all times protecting the identity of the prospective buyers.

A further embodiment provides a method of broadcasting, through electronic communications to a predefined list of non-participating prospective buyers and buyers' representatives, bid information regarding a pending sale transaction. Bid data can be broadcast via email or other electronic means among a community of interested parties to promote and encourage additional competing bids, thus furthering the establishment of true market value for the product or service offered for sale. In this embodiment an URL link is embedded in the broadcast notification associated with the pending sale item such that the non-participating prospective buyers and buyers' representatives could be linked to a web page for registering a competing bid.

Some embodiments of the invention provide methods and systems for conducting auctions containing conditional terms specific to a seller that effect the overall value of a buyer's bid. For example in the real estate market, conditional terms could include closing terms, contingencies, or financing terms. Buyers can be ranked according to the overall value of their bids utilizing a weighted algorithmic process that combines the bid price with the weighted values associated with the conditional terms of sale as compared to the seller's conditional preferences and competing bids from other buyers. The buyer ranking can be displayed on the seller's website associated with the listing as a means to encourage higher valued bids from existing and new prospective buyers.

In one embodiment of the invention, bid data can be broadcast via email or other electronic means among a community of interested parties to promote and encourage additional competing bids thus furthering the establishment of true market value for the product or service offered for sale.

In another embodiment of the invention, a method and system are provided for facilitating interactive electronic commerce transactions over an electronic commerce network between a seller and a plurality of buyers via an independent service provider. A bid is received through an interactive web page displayed within the seller's web page from a buyer for an item for sale. The bid information is displayed to a seller and/or seller's agent associated with the item for sale. A request is received by an ecommerce computer from the seller to broadcast the bid information by electronic mail to at least one other buyer while the bid is pending. The bid information is then broadcast to at least one other buyer under direction of an ecommerce computer of the independent service provider in communication with an email server connected to the email network.

In yet another embodiment of the invention, a method and system are provided for conducting an online bid system between a seller and a plurality of buyers via an independent service provider. A plurality of bids for an item for sale, including bid price and answers to conditional sale questions are received from prospective buyers participating in the online bid management system, are received and stored. The plurality of bids are sorted in a ranking order schema based on an algorithmic model computing the overall net value of the bids based on bid price and weighted values assigned to the conditional questions. The net value of the bids is sorted to determine the current ranking of the bids based on the best to worst overall value. The bids are displayed on the web page associated with the item being auctioned.

In this description, the term "buyer" is intended to include an actual buyer or prospective buyers of an item for sale. The term "seller" identifies a person or party offering an item for sale by an online sale negotiation process among prospective buyers. The buyer submitting the winning bid can be referred to as the "winning buyer." The phrase "electronic commerce network" includes, but is not limited to, the Internet. The phrase can also include a private network, such as an intranet or extranet or any wide area network.

An auction program process hyperlink, as used herein, could include a portable segment of code that can embedded within a web page, thereby adding content to the HTML page. The content can include links and images. The portable code segment can be described alternatively, but without limitation, as a web widget, module, capsule, snippet, or plug-in.

An independent service provider, as used herein, refers to the entity that facilitates, via an ecommerce computer, the interactive electronic commerce transactions between public buyers and sellers through a registration, administration and messaging service. The terms "buyer" and "bidder" are also used interchangeably herein. The terms "offer" and "bid" are used interchangeably.

The embodiments of the invention have been described as computer-implemented processes. It is important to note, however, that those skilled in the art will appreciate that the mechanisms of the disclosed embodiments are capable of being distributed as program products in a variety of forms, regardless of the particular type of physical signal bearing media utilized to carry out the distribution. Examples of signal bearing media include, without limitation, recordable-type media such as diskettes, CD ROMs, flash drives, memory cards, etc.

The corresponding structures, materials, acts, and equivalents of any means plus function elements in any of the claims below are intended to include any structure, material, or acts for performing the function in combination with other claim elements as specifically claimed.

Those skilled in the art will appreciate that many modifications to the exemplary embodiments are possible without departing from the scope of the invention. In addition, it is possible to use some of the features of the embodiments described without the corresponding use of the other features. Accordingly, the foregoing description of the exemplary embodiments is provided for the purpose of illustrating the principles of the invention and not in limitation thereof since the scope of the invention is defined solely by the appended claims.

What is claimed is:

1. A method for facilitating interactive electronic commerce transactions concerning an item being auctioned over an electronic commerce network between a plurality of sellers and a plurality of buyers via an independent service provider, comprising the steps of:
   receiving from a first seller of the plurality of sellers over the electronic commerce network a request to generate an auction program process associated with the first seller;
   generating by an electronic commerce computer of the independent service provider, the auction program process associated with the first seller without uploading to the electronic commerce computer any descriptive information about the item being auctioned;
   generating, by the electronic commerce computer, an URL hyperlink associated with the auction program process;
   communicating the URL hyperlink to the first seller for insertion into a web page hosted on a website other than the independent service providers' website, wherein the web page displays information about the item being auctioned that is for sale; and
   activating the auction program process generated by the electronic commerce computer of the independent service provider when a buyer clicks on the inserted hyperlink on the hosting website.

2. The method for facilitating interactive electronic commerce transactions of claim 1 further comprising:
   entering the URL hyperlink into a web page hosted on a website that displays information associated with the item being auctioned that is for sale; and
   publishing the web page embedded with the URL hyperlink to make available to the buyers a means to make bids on the item being auctioned that is for sale over the electronic commerce network.

3. The method for facilitating interactive electronic commerce transactions of claim 2 further comprising displaying a web page associated with the auction program process after receiving a request from a buyer who clicks on the URL hyperlink.

4. The method for facilitating interactive electronic commerce transactions of claim 1 wherein the first seller includes an agent or representative of the first seller.

5. The method for facilitating interactive electronic commerce transactions of claim 1 wherein an association between the first seller and the auction program process associated with the first seller includes at least one of an identification and contact information for the first seller.

6. The method for facilitating interactive electronic commerce transactions of claim 1 wherein the auction program process associated with the first seller by an electronic commerce computer includes a condition of sale.

7. The method for facilitating interactive electronic commerce transactions of claim 1 wherein the hyperlink associated with the auction program process comprises a code segment to display auction information on the web page and to communicate auction information over the electronic commerce network.

8. The method for facilitating interactive electronic commerce transactions of claim 1 wherein the website is hosted by the first seller or an independent party.

9. The method for facilitating interactive electronic commerce transactions of claim 1 wherein the URL hyperlink comprises a textual form.

10. The method for facilitating interactive electronic commerce transactions of claim 1 wherein the URL hyperlink comprises an image form.

11. A system for facilitating interactive electronic commerce transactions concerning an item being auctioned over an electronic commerce network between a plurality of sellers and a plurality of buyers via an independent service provider, comprising:
   a processor for executing a plurality of components for enabling electronic commerce transactions including:
      a component for receiving from a first seller of the plurality of sellers over the electronic commerce network a request to generate an auction program process associated with the first seller;
      a component for generating by an electronic commerce computer of the independent service provider, the auction program process associated with the first seller without uploading to the electronic commerce computer any descriptive information about the item being auctioned;
      a component for generating, by the electronic commerce computer, an URL hyperlink associated with the auction program process;
      a component for communicating the URL hyperlink to the first seller for inclusion into a web page hosted on a website other than the independent service provider's website, wherein the web page displays information about the item being auctioned that is for sale; and
      a component for activating the auction program process generated by the electronic commerce computer of the independent service provider when a buyer clicks on the inserted hyperlink on the hosting website.

12. The system for facilitating interactive electronic commerce transactions of claim 11 further comprising:
   a component for entering the URL hyperlink into a web page hosted on a website that displays information associated with the item being auctioned that is for sale; and
   a component for publishing the web page embedded with the URL hyperlink to make available to the buyers a means to make bids on the item being auctioned that is for sale over the electronic commerce network.

13. The system for facilitating interactive electronic commerce transactions of claim 12 further comprising a component for displaying a web page associated with the auction program process after receiving a request from a buyer who clicks on the URL hyperlink.

14. The system for facilitating interactive electronic commerce transactions of claim 11 wherein the auction program process associated with the first seller by an electronic commerce computer includes a condition of sale.

15. The system for facilitating interactive electronic commerce transactions over an electronic commerce network of claim 11 wherein the hyperlink associated with the auction program process comprises a code segment to display auction information on the web page and to communicate auction information over the electronic commerce network.

16. The system for facilitating interactive electronic commerce transactions over an electronic commerce network of claim 11 wherein the hyperlink comprises a textual form.

17. The system for facilitating interactive electronic commerce transactions over an electronic commerce network of claim 11 wherein the hyperlink comprises an image form.

18. A storage medium containing instructions that when executed cause a computer system to facilitate interactive electronic commerce transactions concerning an item being auctioned over an electronic commerce network between a plurality of sellers and a plurality of buyers via an independent service provider, by:
   receiving from a first seller of the plurality of sellers over the electronic commerce network a request to generate an auction program process associated with the first seller;
   generating by an electronic commerce computer of the independent service provider, the auction program process associated with the first seller;
   generating, by the electronic commerce computer, an URL hyperlink associated with the auction program process without uploading to the electronic commerce computer any descriptive information about the item being auctioned;
   communicating the URL hyperlink to the first seller for insertion into a web page hosted on a website other than the independent service provider's website, wherein the web page displays information about the item being auctioned that is for sale; and
   activating the auction program process generated by the electronic commerce computer of the independent service provider when a buyer clicks on the inserted hyperlink on the hosting website.

19. The storage medium that causes a computer system to facilitate interactive electronic commerce transactions of claim 18, by:
   entering the URL hyperlink into a web page hosted on a website that displays information associated with the item being auctioned that is for sale; and
   publishing the web page embedded with the URL hyperlink to make available to the buyers a means to make bids on the item being auctioned that is for sale over the electronic commerce network.

20. The storage medium that causes a computer system to facilitate interactive electronic commerce transactions of claim 19 by displaying a web page associated with the auction program process after receiving a request from a buyer who clicks on the URL hyperlink.

* * * * *